(12) United States Patent
Henzler et al.

(10) Patent No.: US 12,480,349 B2
(45) Date of Patent: Nov. 25, 2025

(54) DRIVETRAIN

(71) Applicant: Brose Fahrzeugteile SE & Co. Kommanditgesellschaft, Bamberg, Bamberg (DE)

(72) Inventors: Stephan Henzler, Ubstadt-Weiher (DE); Markus Först, Bamberg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 656 days.

(21) Appl. No.: 17/428,666

(22) PCT Filed: Feb. 4, 2020

(86) PCT No.: PCT/EP2020/052648
§ 371 (c)(1),
(2) Date: Aug. 5, 2021

(87) PCT Pub. No.: WO2020/161087
PCT Pub. Date: Aug. 13, 2020

(65) Prior Publication Data
US 2022/0127894 A1    Apr. 28, 2022

(30) Foreign Application Priority Data
Feb. 5, 2019 (DE) ............... 10 2019 102 857.4

(51) Int. Cl.
*E05F 15/622*    (2015.01)

(52) U.S. Cl.
CPC ....... *E05F 15/622* (2015.01); *E05Y 2201/216* (2013.01); *E05Y 2201/236* (2013.01); *E05Y 2201/244* (2013.01); *E05Y 2201/246* (2013.01); *E05Y 2201/26* (2013.01); *E05Y 2201/266* (2013.01);
(Continued)

(58) Field of Classification Search
CPC ............ E05F 15/622; E05Y 2201/216; E05Y 2201/236; E05Y 2201/244;
(Continued)

(56) References Cited

U.S. PATENT DOCUMENTS

| | | |
|---|---|---|
| 5,731,640 A | 3/1998 | Dietrich et al. |
| 10,247,253 B2 | 4/2019 | Schumann et al. |

(Continued)

FOREIGN PATENT DOCUMENTS

| | | |
|---|---|---|
| DE | 3628285 A1 | 3/1987 |
| DE | 19545379 C1 | 4/1997 |

(Continued)

OTHER PUBLICATIONS

Japanese Office Action for JP 10-2021-7028323, Google English Machine Translation attahed to original dated Sep. 21, 2023, All together 12 Pages.

*Primary Examiner* — T. Scott Fix
(74) *Attorney, Agent, or Firm* — Dickinson Wright PLLC (57) ABSTRACT

A drivetrain for the motorized movement of a motor vehicle closure including at least one friction lock mechanism to provide a friction torque, the friction lock mechanism being part of a coupling mechanism of the drivetrain for coupling two drive components of the drivetrain for conjoint rotation, including a coupling piece on the motor side to a drive component on the motor side and via a coupling piece remote from the motor to a drive component remote from the motor, and including multiple friction lock elements which can be rotated about a drive axis, are situated coaxially to one another and form the friction lock mechanism, a middle one of the friction lock elements being concentric to one another and in frictional engagement with two others of the friction lock elements.

24 Claims, 6 Drawing Sheets

(52) U.S. Cl.
CPC ..... *E05Y 2201/49* (2013.01); *E05Y 2201/608* (2013.01); *E05Y 2201/632* (2013.01); *E05Y 2400/3013* (2024.05); *E05Y 2900/546* (2013.01)

(58) Field of Classification Search
CPC ........... E05Y 2201/246; E05Y 2201/26; E05Y 2201/266; E05Y 2201/49; E05Y 2201/608; E05Y 2201/632; E05Y 2201/476; E05Y 2201/47; E05Y 2201/48; E05Y 2900/546; F16H 2025/2071
USPC ........................................................ 74/89.38
See application file for complete search history.

(56) References Cited

U.S. PATENT DOCUMENTS

| | | | |
|---|---|---|---|
| 11,332,969 | B2 | 5/2022 | Schmengler et al. |
| 2011/0290050 | A1 | 12/2011 | Kummer et al. |
| 2014/0166423 | A1 | 6/2014 | Nias et al. |

FOREIGN PATENT DOCUMENTS

| | | | | |
|---|---|---|---|---|
| DE | 102008008541 B3 | | 3/2009 | |
| DE | 102008031228 A1 | * | 1/2010 | ............ E05F 15/622 |
| DE | 102008061115 A1 | | 6/2010 | |
| DE | 102009033277 A1 | * | 1/2011 | ............ E05F 15/622 |
| DE | 102014100125 A1 | | 7/2015 | |
| DE | 102016113353 A1 | | 1/2018 | |
| DE | 102017101325 A1 | | 7/2018 | |
| DE | 102018100562 A1 | | 7/2019 | |
| DE | 102019130423 A1 | | 5/2021 | |
| EP | 1731783 A2 | * | 12/2006 | .............. F16C 27/02 |
| EP | 2159438 A1 | * | 3/2010 | ............ E05F 15/622 |
| EP | 3032020 A1 | * | 6/2016 | ............ E05F 15/622 |
| EP | 3232076 A1 | | 10/2017 | |
| JP | 2001159429 A | * | 6/2001 | |
| JP | 2010014274 A | | 1/2010 | |
| JP | 2015200353 A | | 11/2015 | |
| WO | 2015148322 A1 | | 10/2015 | |

* cited by examiner

DRIVETRAIN

CROSS-REFERENCE TO RELATED APPLICATIONS

This application is the U.S. National Phase of PCT Application No. PCT/EP2020/052648 filed on Feb. 4, 2020, which claims priority to German Patent Application No. DE 10 2019 102 857.4, filed on Feb. 5, 2019, the disclosures of which are hereby incorporated in their entirety by reference herein.

TECHNICAL FIELD

The present disclosure relates to a drivetrain of a drive for motorized displacement of a closure element of a motor vehicle.

BACKGROUND

Motor vehicles may include closure elements such as doors, sliding doors, or hatches, such as rear hatches, trunk lids, engine hoods, cargo space floors or the like, of a motor vehicle. In this regard, the term "closure element" is intended to be understood in a broad sense in this instance.

The closure element may be adjusted by a drivetrain that guides a force flow of the drive force produced by a drive motor of the drive. Accordingly, the drivetrain may have drive components, such as shafts, gear mechanisms, clutches, brakes or the like.

SUMMARY

The problems addressed by the present disclosure may be to reduce a technical length of the drivetrain.

In one or more embodiments, a drivetrain is provided that instead of an axial friction engagement, the drivetrain uses a radial friction engagement between the friction engagement elements of a friction engagement mechanism which is a component of a coupling mechanism of the drivetrain. In this manner, the normal force which produces the friction torque acts radially, that is to say, orthogonally relative to the drive axle, and not along the drive axle. A pressing mechanism which acts in an axial direction is consequently no longer necessary, which accordingly reduces the technical length and consequently the axially necessary structural space.

In one or more embodiments, in a radial direction, three friction engagement elements cooperate with each other, of which the central one is a tolerance ring. A "tolerance ring" is a radial annular or sleeve-like intermediate element which is arranged in a gap between two components which are orientated concentrically relative to each other, in this case two friction engagement elements, in order to produce a friction engagement, which allows a torque transmission, between the two components which are orientated concentrically relative to each other. To this end, a tolerance ring has in a peripheral direction, that is to say, around the center axis thereof, an outer and/or inner contour which is non-uniform, that is to say, not completely cylindrical, whereby the tolerance ring provides a defined resilient force in a radial direction. Since a tolerance ring has a relatively small thickness in a radial direction, it also takes up in a radial direction relatively little structural space in comparison with helical pressure springs. As an example, the tolerance ring has a thickness of a maximum of 5 mm, or a maximum of 3 mm, or a maximum of 2 mm, or a maximum of 1.5 mm.

The term "thickness" is intended in this case to be understood to be the difference between the maximum outer radius and the minimum inner radius of the tolerance ring.

The friction engagement elements may be arranged concentrically relative to each other at least in portions and that the central friction engagement element be a tolerance ring and be clamped radially between the two additional elements of the friction engagement elements in order to provide a friction engagement connection. The arrangement of the friction engagement elements of the friction engagement mechanism which is a component of the coupling mechanism is therefore particularly carried out in such a manner that one friction engagement element which is in frictional engagement with the central friction engagement element is arranged radially inside the central friction engagement element and is in frictional engagement radially externally with the central friction engagement element. Additionally or alternatively, the other friction engagement element which is in frictional engagement with the central friction engagement element to be arranged radially outside the central friction engagement element and to be in frictional engagement radially internally with the central friction engagement element. Therefore, a radial frictional engagement is produced between friction engagement elements which cooperate with each other in a frictionally engaged manner, as an example exclusively a radial frictional engagement. The clamped central friction engagement element which is formed by a tolerance ring according to the proposal produces a radial clamping force, in particular a radial resilient force, which brings about the frictional engagement. A separate pressing mechanism for producing a pressing force of the friction engagement elements against each other is consequently unnecessary. The pressing force is brought about by the radial clamping or resilient force.

As an example, the central friction engagement element, such as the tolerance ring, may include a plurality of radial protrusions. These protrusions further protrude radially in a radial direction relative to the lateral edges and such as a peripheral flat edge of the central friction engagement element and/or relative to the central friction engagement element, which flat edge forms the lateral edges. The portions in a peripheral direction between the radial protrusions may extend cylindrically about the drive axle, therefore extend on a cylinder jacket of a circular cylinder having a cylinder axis which is coaxial with the drive axle. The radial protrusions may be stamped portions and may have been produced by stamping so that on the other radial side corresponding indentations or beads are formed. The protrusions and consequently the locations, which protrude furthest radially, of the central friction engagement element may form one friction face of the central friction engagement element while the other radial side forms the other friction face of the central friction engagement element. The latter friction face may be constructed completely cylindrically, that is to say, in a flat manner.

In one or more embodiments, coupling mechanism is provided. This coupling mechanism may be an overload coupling. As an example, a breakaway torque between two of the friction engagement elements which are in frictional engagement is greater than that of the other two friction engagement elements which are in frictional engagement with each other so that, in the event of an overload, there is still static friction between one friction engagement element pair or the associated friction face pair, that is to say, a rotationally secure connection continues to exist, whereas at the radially other side there is produced sliding friction and the rotationally secure connection is eliminated. The rotationally secure connection which continues to exist at one side in this overload situation may be ensured in that during the assembly the central friction engagement element or the tolerance ring is pressed in, such as pressed in radially inwardly with the protrusions in one of the two friction engagement elements. The protrusions may thereby become embedded in the material of the friction engagement element which is in frictional engagement therewith. As an example, the central friction engagement element is mounted by means of a press-fit on one of the friction engagement elements, such as the element of the friction engagement elements toward which the protrusions are directed.

Such an overload situation occurs, for example, during a manual displacement of the rear hatch. By the friction engagement mechanism then being able to slide through, damage to the drive is prevented.

In one or more embodiments, one or more of the friction faces, of the friction engagement elements may be formed of or include metal In one or more embodiments, the coupling mechanism may be coupled to the motor-side drive component and/or the drive component remote from the motor by a plug type connection. The plug type connection may be formed by a claw type coupling. In this manner, the coupling mechanism can be produced as a preassembled unit and can be connected in a relatively simple manner to the respective drive component.

According to another embodiment, a drive for the motorized displacement of a closure element of a motor vehicle and including a drivetrain is provided. Reference may be made to all the explanations in relation to the drivetrain according to the proposal if they are suitable for explaining the drive. The drive is may be a spindle drive, and the coupling mechanism and/or the friction engagement mechanism of the drivetrain may be connected between a drive motor and a spindle/spindle nut gear mechanism of the drive.

According to another embodiment, which also has independent significance, a closure element arrangement of a motor vehicle is provided. The closure element arrangement includes a closure element which is coupled to the body of the motor vehicle in a displaceable manner and has at least one drive according to the proposal for the motorized displacement of the closure element. Again, reference may be made to the above explanations in relation to the drivetrain according to the proposal and the drive according to the proposal.

BRIEF DESCRIPTION OF THE DRAWINGS

The invention is explained in greater detail below with reference to drawings which merely illustrate embodiments. In the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known drivetrain is provided in DE 10 2017 101 325 A1. The drivetrain is a component of a spindle drive for the motorized displacement of a rear hatch of a motor vehicle. A coupling mechanism which is configured as an overload coupling is associated with the drivetrain. The coupling mechanism is connected between two drive components, one of which is a motor-side gear shaft of an intermediate gear mechanism of the drivetrain and the other of which is a spindle of a spindle/spindle nut gear mechanism remote from the motor. The coupling mechanism has a friction engagement mechanism which allows, on the one hand, secure retention of the rear hatch in intermediate positions and, on the other hand, manual displacement of the rear hatch after a breakaway torque of the friction engagement mechanism has been overcome. The "breakaway torque" is the maximum applicable torque which is necessary in order to separate an adhesive connection which is produced by static friction and which exists between two components which can be rotated relative to each other, wherein the static friction changes into sliding friction when the breakaway torque is reached.

The constructive structure of the known drivetrain ensures in principle a relatively high level of operating reliability and with regard to the manual displaceability a high level of comfort during use. However, the coupling mechanism takes up in the direction of the drive axle of the drivetrain a comparatively large amount of structural space. Thus, a separate pressing mechanism with helical pressure springs which act axially, that is to say, which act along the drive axle, and which pretension the friction engagement elements axially with respect to each other is provided. This increases the technical length of the drivetrain and consequently of the drive.

The drivetrain 1 which is illustrated in the drawings is associated with a drive 2 for the motorized displacement of a closure element 3, in this instance a rear hatch of a motor vehicle. The drivetrain 1 serves to guide the force path of the driving force produced by a drive motor 4 of the drive 2.

The application of the closure element 3 which is configured as a rear hatch is the main factor in this instance. However, the solution according to the proposal is also applicable to all other types of closure elements. Reference may be made to the exemplary listing in the introductory part of the description.

Figure 1:
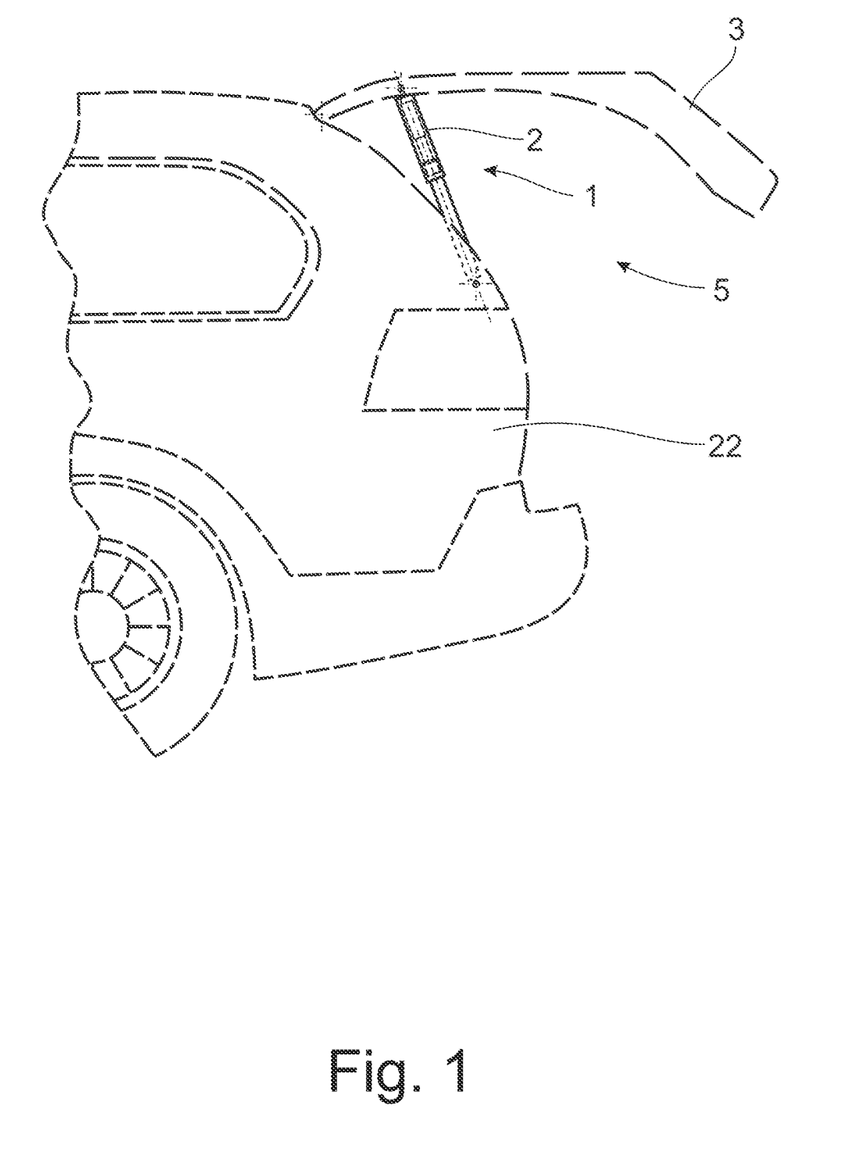
FIG. 1 is a highly schematic illustration of the rear region of a motor vehicle having a closure element arrangement according to the proposal which has drives according to the proposal with a drivetrain according to the proposal.

A total of two drives 2, which act on the two lateral edges of a rear hatch opening 5 and on the rear hatch 3 itself, are associated with the rear hatch 3 which is illustrated in FIG. 1. At the end, ball sockets 2*a*, 2*b* which are in engagement with corresponding spherical heads on the respective lateral edge of the rear hatch opening 5 and on the rear hatch 3 are associated with the drive 2 which is configured in this instance as a spindle drive. Only the drive 2 which can be seen in FIG. 1 is discussed below. All the explanations apply accordingly to the drive which cannot be seen in FIG. 1 and which is located behind it and to an arrangement having only a single drive 2.

Figure 3:
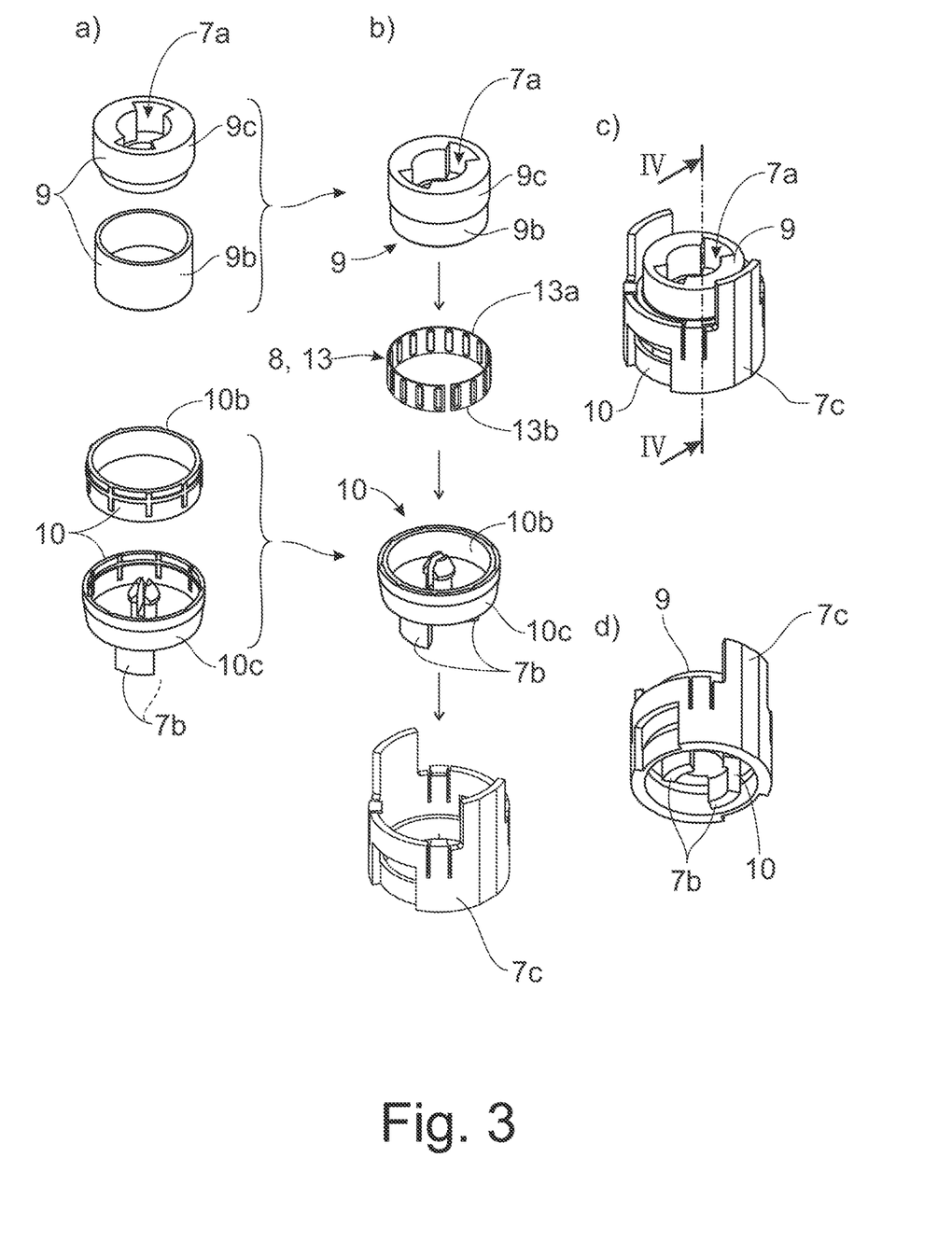
FIG. 3 is a perspective view a) of an exploded illustration of individual friction engagement elements of a first embodiment of the coupling mechanism, b) an exploded illustration of the coupling mechanism, c) the coupling mechanism obliquely from above in the assembled state and d) the coupling mechanism obliquely from below in the assembled state.
Figure 4:
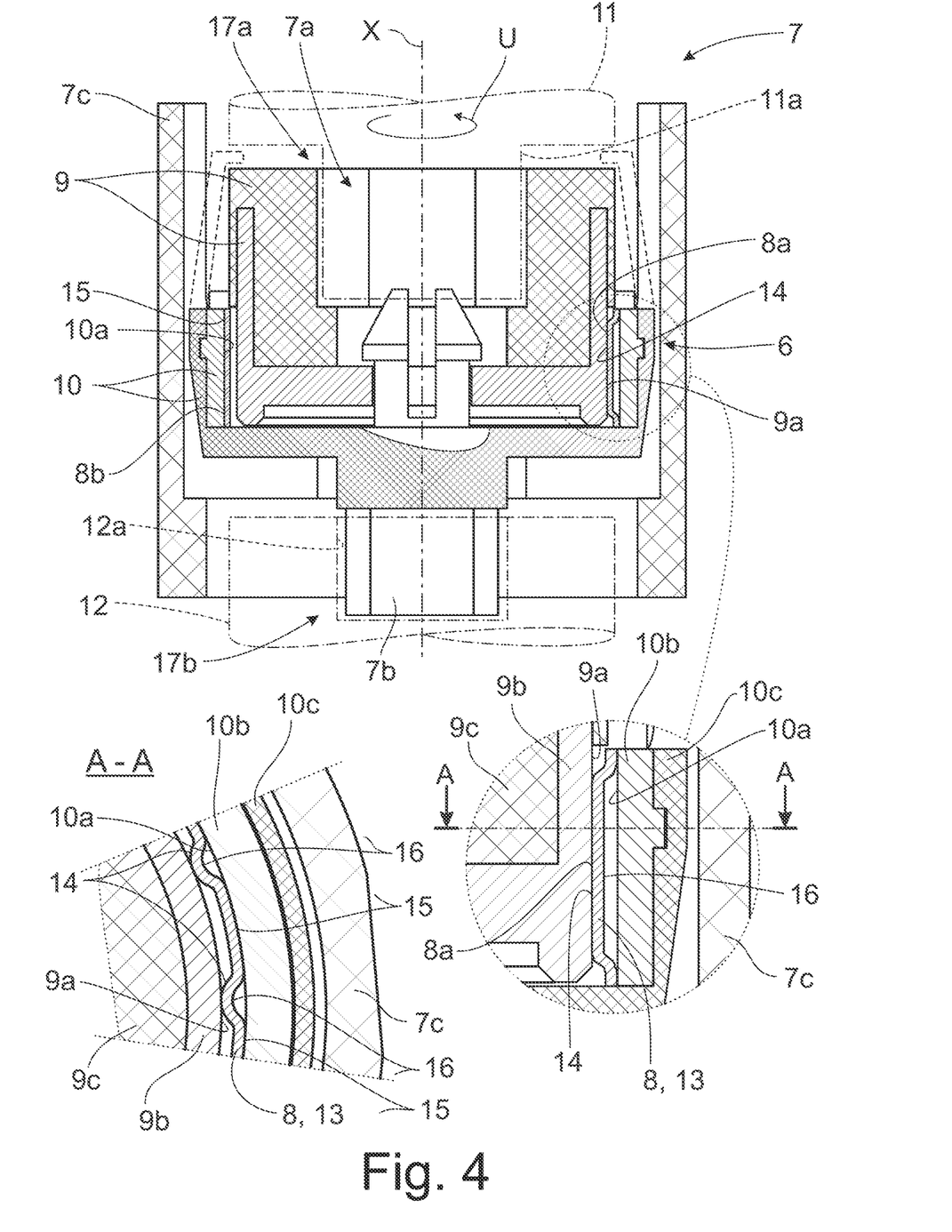
FIG. 4 shows different sectional views of the coupling mechanism according to FIG. 3.
Figure 5:
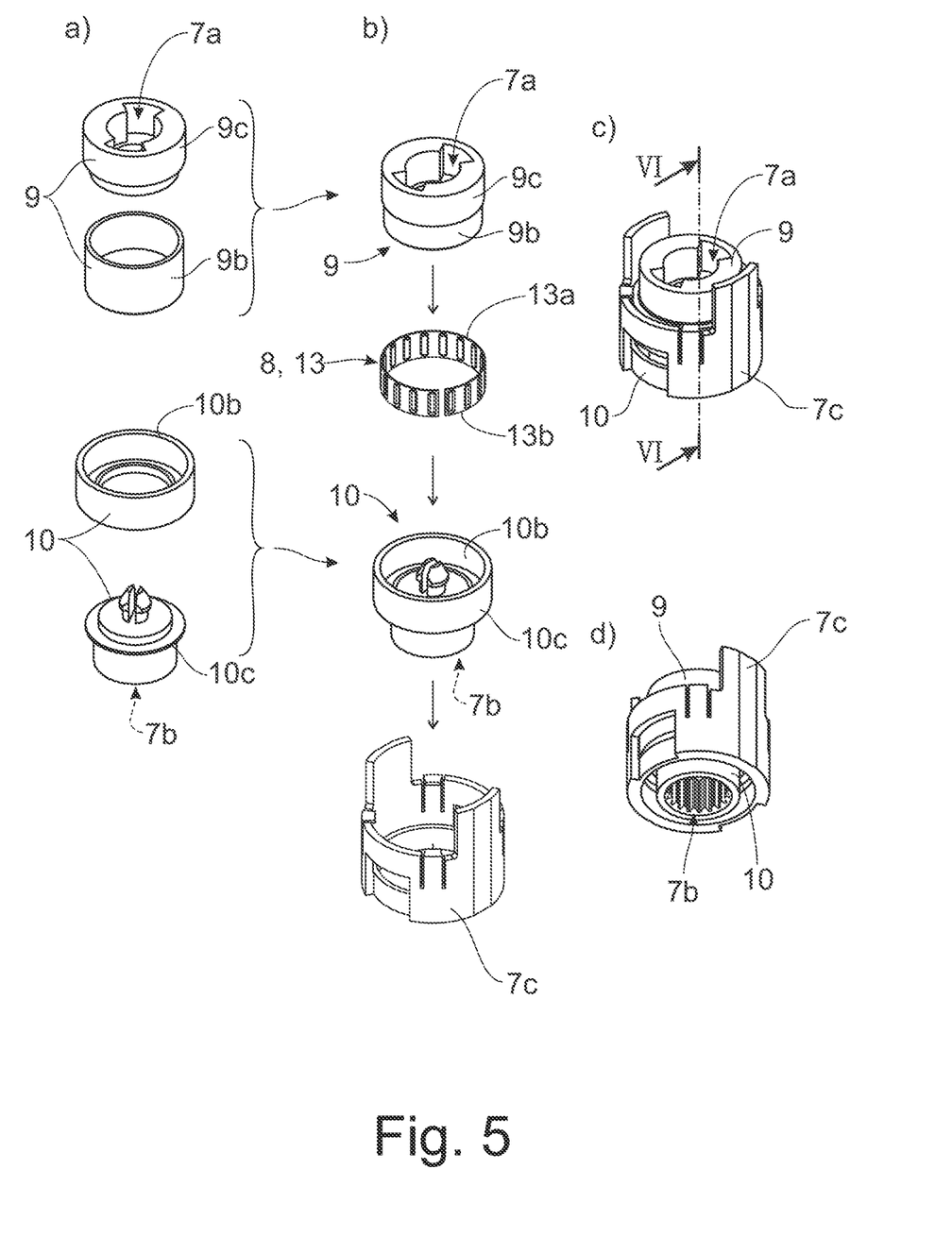
FIG. 5 is a perspective view a) of an exploded illustration of individual friction engagement elements of a second embodiment of the coupling mechanism, b) an exploded illustration of the coupling mechanism, c) the coupling mechanism obliquely from above in the assembled state and d) the coupling mechanism obliquely from below in the assembled state
Figure 6:
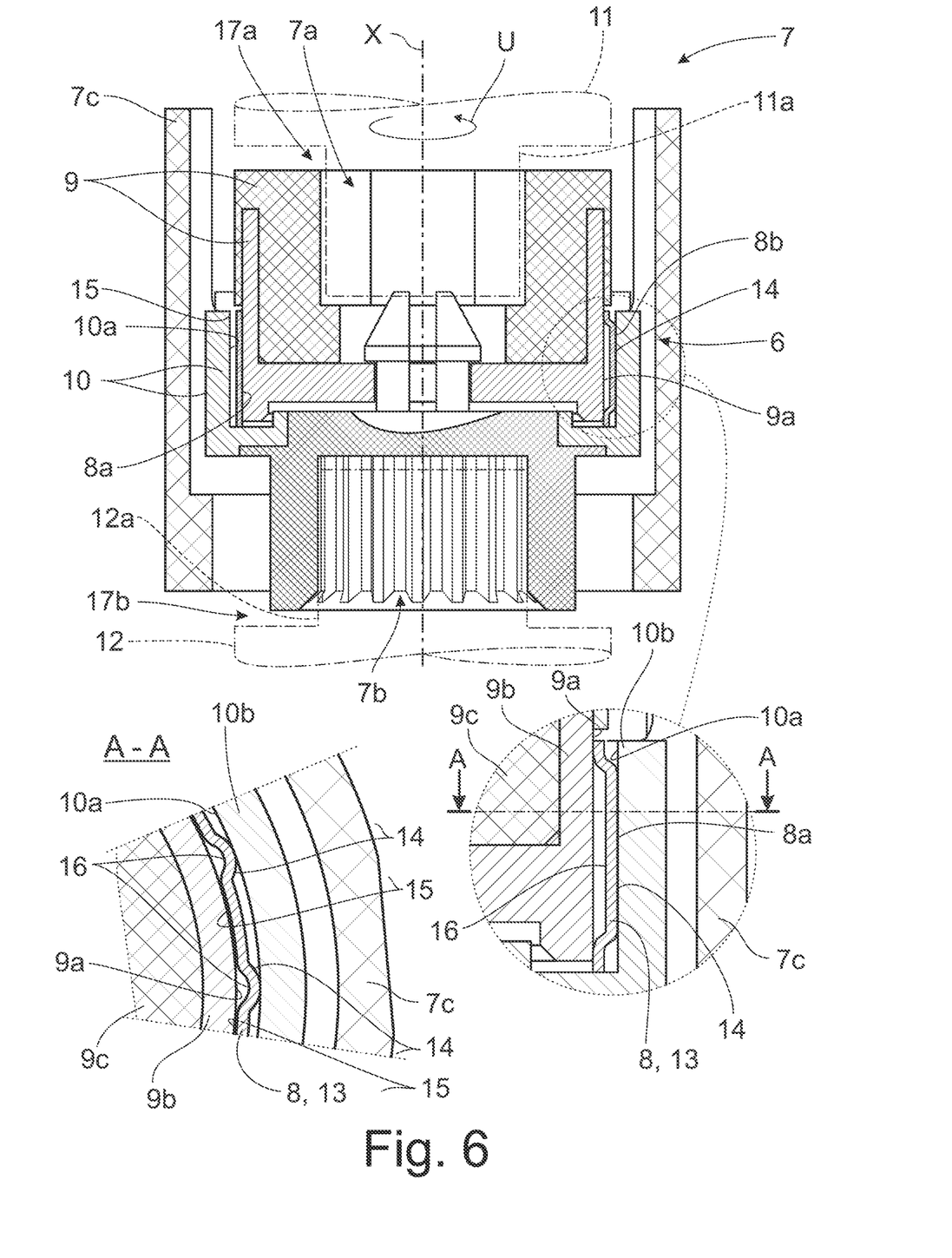
FIG. 6 shows different sectional views of the coupling mechanism according to FIG. 5.

The drivetrain 1 of the drive 2 is provided with a friction engagement mechanism 6 for providing a friction torque. The friction engagement mechanism 6 is a component of a coupling mechanism 7 of the drivetrain 1 which is used to transmit torque. FIGS. 3 and 4 show a first embodiment of the coupling mechanism 7, FIGS. 5 and 6 show a second embodiment. The coupling mechanism 7 provided according to the proposal is optimally suitable for an arrangement in which the drive 2 is configured to be self-locking, that is to say, it cannot be driven backward. In order nevertheless to allow manual displaceability of the rear hatch 3, the coupling mechanism 7 is configured as a slip coupling so that, after a frictional force has been overcome, a corresponding manual displacement of the rear hatch 3 is possible.

In another embodiment which is not illustrated here, the drivetrain 1 can further have a braking mechanism which can also be integrated in the coupling mechanism 7 or which can in any case be arranged in a common housing with the coupling mechanism 7. Such a braking mechanism may be used for continuous braking of the drivetrain 1 in order to hold the rear hatch 3 in intermediate positions in a reliable manner. As an example, such a braking mechanism is configured in the manner of a disk brake or in the manner of a drum brake.

The coupling mechanism 7 has a plurality of friction engagement elements 8, 9, 10 which can be rotated about a drive axle X and which are arranged coaxially relative to each other and which form the friction engagement mechanism 6. As an example, three friction engagement elements 8, 9, 10 may be provided in this instance. A central friction engagement element 8, that is to say, a friction engagement element 8 which is arranged between the two additional friction engagement elements 9, 10, is in frictional engagement therewith.

The coupling mechanism 7 further has a motor-side coupling piece 7*a* and a coupling piece 7*b* which is remote from the motor. The coupling mechanism 7 is coupled in a rotationally secure manner via the motor-side coupling piece 7*a* to a motor-side drive component 11 and via the coupling piece 7*b* remote from the motor to a drive component 12 which is remote from the motor. The term "coupled in a rotationally secure manner" is intended to be understood to mean here that there exists a positive-locking connection in a peripheral direction U, that is to say, in the direction about the drive axle X, and may also releasable, such as by a relative axial movement between the coupling mechanism 7 and the respective drive component 11, 12. As an example, in this instance, the motor-side coupling piece 7*a* is coupled to a separate coupling counter-piece 11*a*, which is associated therewith, of the motor-side drive component 11 and the coupling piece 7*b* which is remote from the motor is coupled to a separate coupling counter-piece 12*a*, which is associated therewith, of the drive component 12 remote from the motor in a peripheral direction U in a positive-locking manner. The coupling mechanism 7 is preferably arranged in this instance in an individual housing 7*c*.

A significant aspect is, on the one hand, that the friction engagement elements 8, 9, 10 are arranged at least partially concentrically relative to each other, that is to say, an inner friction engagement element 9 is radially surrounded by an additional friction engagement element 8 which is in turn radially surrounded by a third friction engagement element 10.

The term "at least partially concentrically" is intended to be understood to mean that at least the portions which form the friction faces of the respective friction engagement element 8, 9, 10, that is to say, the faces of the friction engagement elements 8, 9, 10 in frictional engagement with each other, are arranged concentrically relative to each other.

On the other hand, it is also significant that the central friction engagement element 8 is a tolerance ring 13 and is radially clamped between the two additional friction engagement elements 9, 10 in order to provide a frictionally engaging connection. The term "radially clamped" is intended to be understood to mean that a radially orientated normal force is provided between the two friction engagement elements 8, 9, on the one hand, and 8, 10, on the other hand, which abut each other in a frictionally engaging manner. The tolerance ring 13 is configured in this instance so that it may also produces a radial resilient force in this case.

In this instance, one friction engagement element 9 which is in frictional engagement with the central friction engagement element 8 is arranged radially inside the central friction engagement element 8. This radially inner friction engagement element 9 is in frictional engagement with the central friction engagement element 8 at the radially outer side. In this instance, the other friction engagement element 10 which is in frictional engagement with the central friction engagement element 8 is arranged radially outside the central friction engagement element 8. This radially outer friction engagement element 10 is in frictional engagement with the central friction engagement element 8 at the radially inner side. As a result of the arrangement of the tolerance ring 13 between the two friction engagement elements 9, 10, therefore, a radial clamping force and also in this instance a radial resilient force are produced and form a normal force which defines the respective frictional engagement.

There are intended to be described in detail below a first embodiment of the drivetrain 1 or the coupling mechanism 7 with reference to FIGS. 3 and 4 and a second embodiment of the drivetrain 1 or the coupling mechanism 7 with reference to FIGS. 5 and 6.

The embodiments initially have in common the fact that the central friction engagement element 8, that is to say, the tolerance ring 13, has in a peripheral direction U a plurality of radial protrusions 14. The radial protrusions 14 protrude radially in this case relative to the lateral edges 13*a*, 13*b* of the tolerance ring 13 and/or relative to, in this instance, flat portions 15 of the tolerance ring 13. The term "flat" is intended to be understood to mean in this context that the portions 15 which are provided in a peripheral direction U between the radial protrusions 14 extend cylindrically about the drive axle X, that is to say, they are located on a cylinder jacket of a circular cylinder with a cylinder axis which is coaxial relative to the drive axle X. The protrusions 14 are in this instance stamped portions, whereby indentations 16 corresponding to the protrusions 14 are formed on the radial side of the tolerance ring 13 opposite the radial protrusions 14. The indentations 16 have in this instance, similarly to the protrusions 14, an elongate extent which extends parallel with the drive axle X. Corresponding indentations 16 are also referred to as beads. In principle, however, it is also conceivable to provide a tolerance ring which does not have any protrusions and/or indentations and which may be flat, that is to say, completely cylindrical in a peripheral direction.

The embodiments which are illustrated and in this regard differ in that the radial protrusions 14 of the central friction engagement element 8 are directed in one case radially inwardly (FIGS. 3 and 4) and, in the other case, are directed radially outwardly (FIGS. 5 and 6). In principle, a combination is also conceivable, that is to say, a number of radial protrusions are directed radially inwardly and others are directed radially outwardly.

In the embodiment according to FIGS. 3 and 4, the radially inwardly directed protrusions 14 form a radially internal friction face 8a of the central friction engagement element 8 which is in frictional engagement with a friction face 9a which is formed by the radially internal friction engagement element 9. In this case, the portions 15 which are located between the protrusions 14 in a peripheral direction U form a radially external friction face 8b of the central friction engagement element 8 which is in frictional engagement with the friction face 10a which is formed by the radially external friction engagement element 10.

In the embodiment illustrated in FIGS. 5 and 6, the protrusions 14 form the radially external friction face 8b which is in frictional engagement with the friction face 10a which is formed by the external friction engagement element 10. In this instance, the portions 15 which are located between the protrusions 14 in a peripheral direction U then form the radially internal friction face 8a of the central friction engagement element 8 which is in frictional engagement with the friction face 9a which is formed by the radially internal friction engagement element 9.

The coupling mechanism 7 which serves to couple the two drive components 11, 12 of the drivetrain 1 in a rotationally secure manner is an overload coupling which is connected between the drive components 11, 12 in both embodiments.

However, the two embodiments differ from each other in terms of the breakaway torques which are defined between the respective friction faces. In the embodiment in FIGS. 3 and 4, a breakaway torque is thus, and may be greater between the central friction engagement element 8 and the internal friction engagement element 9, as a result of the protrusions 14, than a breakaway torque between the central friction engagement element 8 and the external friction engagement element 10. In the embodiment illustrated in FIGS. 5 and 6, however, it is the case that a breakaway torque between the central friction engagement element 8 and the external friction engagement element 10 is, in this instance, greater as a result of the protrusions 14 than a breakaway torque between the central friction engagement element 8 and the internal friction engagement element 9. The higher breakaway torque may be achieved by embedding the protrusions 14 in the friction face of the associated friction engagement element 9, 10, respectively.

Individual or all friction faces 8a, 8b, 9a, 10a may be constructed as metal faces. As an example, in this instance, each of the friction faces is a metal face. In principle, however, it is also conceivable for individual or all friction faces to be formed by a plastic material.

The central friction engagement element 8 which is formed by the tolerance ring 13 at least partially may include, completely in this instance, metal. In this instance, a metal ring which is interrupted, that is to say, slotted, in a peripheral direction U is involved. As an example, however, it is also conceivable to provide a continuous metal ring, that is to say, one free from interruptions in a peripheral direction U. As an example, in this instance, the tolerance ring 13 is formed by a bent metal strip having two strip ends which are opposite each other in the mounted state in a peripheral direction U and which are spaced apart from each other in a peripheral direction U or touch each other.

The central friction engagement element 8 or the tolerance ring 13 is configured, for example, in this instance, so that the ratio of the maximum outer radius of the central friction engagement element 8 relative to the axial length thereof is at least 1, at least 1.2, at least 1.4 and, or at least 1.6. Additionally or alternatively, there may be provision for the ratio of the minimum inner radius of the central friction engagement element 8 relative to the axial length thereof to be at least 1.8, or 2.2, or 2.6 and, for example in this instance, at least 3. In this case, the maximum outer radius is the spacing of the center axis of the central friction engagement element 8 from the radially most external location of the friction engagement element 8 which is defined in particular by a portion 15 which is located between two radial protrusions 14 (FIGS. 3 and 4) or which is defined by a radially outwardly directed protrusion 14 (FIGS. 5 and 6). The minimum inner radius is accordingly the spacing of the center axis of the central friction engagement element 8 relative to the radially most internal location of the friction engagement element 8 which is defined in particular by a radially inwardly directed protrusion 14 (FIGS. 3 and 4) or by a portion 15 between two radial protrusions 14 (FIGS. 5 and 6).

FIGS. 3 and 5 illustrate the structure of the coupling mechanism 7 and in particular of the radially internal friction engagement element 9 and radially external friction engagement element 10.

Thus, the radially internal friction engagement element 9 and/or the radially external friction engagement element 10 may be in several pieces, that is to say, be composed from several separate components, such as two or more. As shown in FIGS. 3a) and 5a), both friction engagement elements 9, 10 are in several pieces and comprise in this instance for example two portions 9b, 9c or 10b, 10c.

As an example, in this instance, the first portion 9b, 10b of the respective friction engagement element 9, 10 and the second portion 9c, 10c of the respective friction engagement element 9, 10 are connected to each other in a positive-locking, non-positive-locking and/or materially engaging manner in a peripheral direction U and/or axially. A positive-locking connection between the two portions 9b, 9c or 10b, 10c can be produced by pinning, locking or pressing. By pressing, it is also possible to produce a non-positive-locking connection between the two portions 9b, 9c or 10b, 10c. A materially engaging connection between the two portions 9b, 9c or 10b, 10c can be produced for example by adhesion, friction welding or laser welding, chemical etching or injection-molding. In one or more embodiments, the radially internal friction engagement element 9 and/or the radially external friction engagement element 10 is a multi-component injection-molded member, in particular a two-component injection-molded member.

In the embodiment according to FIGS. 3 and 4, both the friction engagement element 9 and the friction engagement element 10 are two-component injection-molded members.

As an example, in this instance, the first portion 9b of the radially internal friction engagement element 9 may include metal, such as steel, and the second portion 9c may include a plastics material, in particular a Duroplast. This last material has the advantage that it may have damping properties. The first portion 9b, which may be configured in a sleeve-like manner, forms in this instance the friction face 9a of the friction engagement element 9. The metal of the first portion 9b may be a softer metal than the metal of the central friction engagement element 8 in order to promote embedding of the protrusions 14 of the friction engagement element 8 in the friction engagement element 9. Furthermore, the first portion 10b of the radially external friction engagement element 10 also may include, metal, such as steel, and the second portion 10c may include a plastics material, in particular a Duroplast. The first portion 10b which may also be configured in a sleeve-like manner forms the friction face 10a of the friction engagement element 10 in this case.

In the embodiment according to FIGS. 5 and 6, the friction engagement element 9 is also a two-component injection-molded member. In the friction engagement element 10, however, the two portions 10b and 10c are inserted axially in a positive-locking manner one in the other and adhesively bonded to each other, welded or the like. Otherwise, the structure and the material of the friction engagement elements 9, 10 correspond to the structure and the material according to FIGS. 3 and 4, but with the exception that in this instance the metal of the first portion 10b of the external friction engagement element 10 in particular has a softer metal than the metal of the central friction engagement element 8 in order to promote embedding of the protrusions 14 of the friction engagement element 8 into the friction engagement element 10 in this instance.

Alternatively, in a manner not depicted here, there may also be provision for the entire radially internal friction engagement element 9 to comprise metal, in particular a softer metal than the central friction engagement element 8, or a plastics material. Additionally or alternatively, there may also be provision for the entire radially external friction engagement element 10 to comprise metal, in particular a softer metal than the central friction engagement element 8, or a plastics material.

In the situation not illustrated here that, in addition, a braking mechanism is provided, a friction element of the braking mechanism, in particular a brake disk, can be arranged in a rotationally secure manner and in particular in an axially secure manner on the friction engagement element 10 and can cooperate with a friction counter-element which is arranged in a rotationally secure manner on the housing 7c in a braking manner, in particular in a continuously braking manner.

As in particular the sectional illustrations in FIGS. 4 and 6 show, the radially internal friction engagement element 9 can, in the mounted state of the coupling mechanism 7, be locked axially to the radially external friction engagement element 10. This is carried out, in this instance, in both embodiments by locking a central locking mushroom-like member of the radially external friction engagement element 10 in a central hole in the radially internal friction engagement element 9. As illustrated in FIG. 4 with a broken line, additionally or alternatively a locking via concentric locking projections of the radially external friction engagement element 10 on the radially internal friction engagement element 9 can also be carried out. In both variants, the locking may be carried out with axial play in order to ensure a rotational movement of the radially internal friction engagement element 9 relative to the radially external friction engagement element 10. Other types of connection, by means of which the friction engagement elements 9, 10 can be coupled to each other in an axially positive-locking manner, in particular with axial play, are also conceivable.

It is further illustrated in FIGS. 4 and 6 that, in this instance, the radially internal friction engagement element 9 provides the motor-side coupling piece 7a of the coupling mechanism 7 and the radially external friction engagement element 10 provides the coupling piece 7b of the coupling mechanism 7 remote from the motor. In an alternative embodiment which is not illustrated here, however, it would also be conceivable for the radially internal friction engagement element 9 to provide the coupling piece 7b of the coupling mechanism 7 remote from the motor and for the radially external friction engagement element 10 to provide the motor-side coupling piece 7a of the coupling mechanism 7.

As FIGS. 3c) and d) illustrate, on the one hand, and FIGS. 5c) and d), on the other hand, the motor-side coupling piece 7a of the coupling mechanism 7 is coupled to the motor-side drive component 11 and/or the coupling piece 7b of the coupling mechanism 7 remote from the motor is coupled to the drive component 12 remote from the motor by a plug type connection 17a, 17b. In the embodiment in FIGS. 3 and 4, both the motor-side plug type connection 17a and the plug type connection 17b remote from the motor are claw type couplings. In the embodiment in FIGS. 5 and 6, the motor-side plug type connection 17a is also a claw type coupling but the plug type connection 17b remote from the motor is a multiple-toothed connection. In principle, still other types of connection are also conceivable, for example, by means of a splined shaft profile, a multi-sided profile, in particular a hexagonal profile, a star-like profile (Torx profile) or the like.

As viewing FIGS. 3b) to d), on the one hand, and FIGS. 5b) to d), on the other hand, together shows for the respective embodiment, it is conceivable to provide the coupling mechanism 7 initially as a preassembled unit and to subsequently couple it in a positive-locking manner to the respective drive component 11, 12 via the above-mentioned plug type connection 17a, 17b.

According to another aspect of teaching, which has independent significance, the above drive 2 per se is claimed. The drive 2 according to the proposal accordingly serves to displace a closure element 3 of a motor vehicle in a motorized manner, wherein a drivetrain 1 which is configured according to the first teaching mentioned is provided. Reference may be made to all the explanations in relation to the drivetrain 1 according to the proposal.

Figure 2:
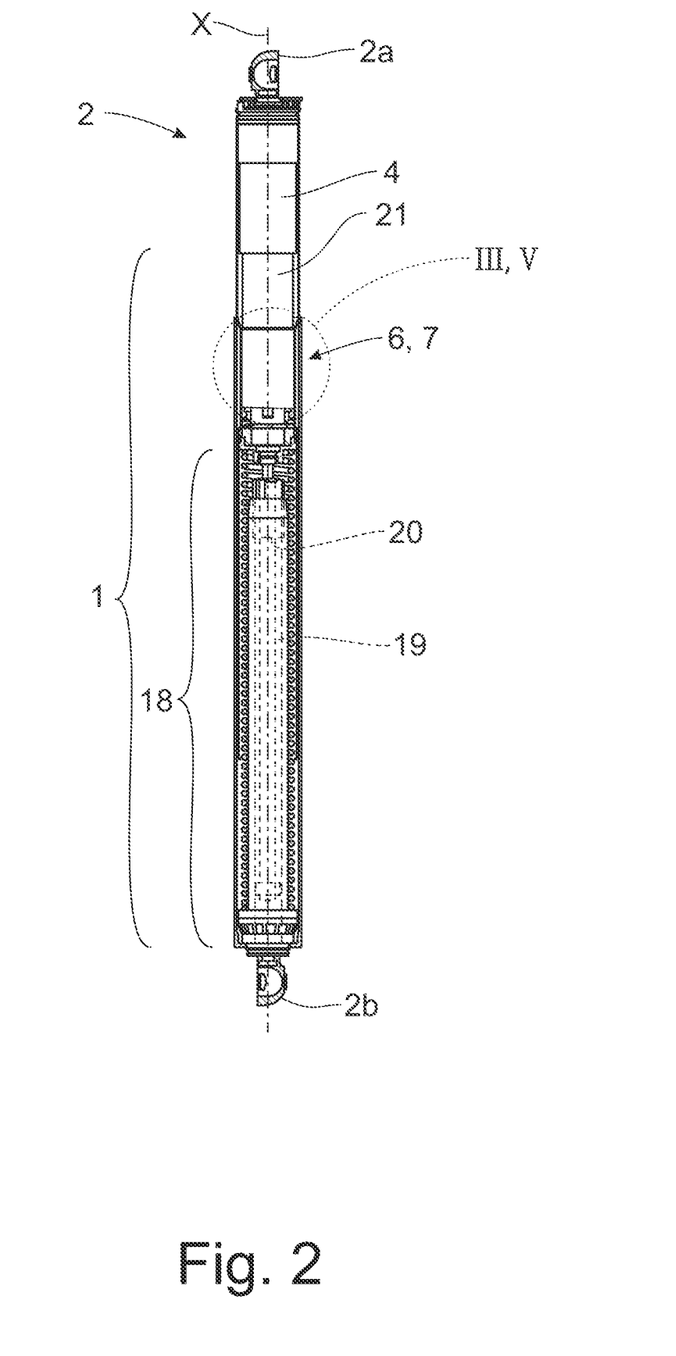
FIG. 2 is a longitudinal section of one of the drives according to FIG. 1 in the retracted state with a coupling mechanism.

In another embodiment, illustrated in FIG. 2, the drive 2 is a spindle drive. The drive 2 has a drive motor 4 and a spindle/spindle nut gear mechanism 18 which is connected downstream of the drive motor 4 and which has a spindle 19 and an associated spindle nut 20 for producing linear drive movements. FIG. 2 depicts the fact that, in the illustrated embodiment, the coupling mechanism 7 of the drive 2 is connected between the drive motor 4 and the spindle/spindle nut gear mechanism 18. As an example in this instance, the motor-side drive comment 11 is accordingly a drive shaft, for example, in the form of a motor shaft of the drive motor 4 or in the form of a gear shaft of an intermediate gear mechanism 21 which is optionally connected between the drive motor 4 and the coupling mechanism 7. The drive component 12 which is remote from the motor is, in this instance, accordingly a gear mechanism component of the spindle/spindle nut gear mechanism 18, in this instance the spindle 19.

According to another aspect of teaching, which also has independent significance, a closure element arrangement (illustrated in FIG. 1) of a motor vehicle is claimed per se. The closure element arrangement according to the proposal has a closure element 3 which is displaceably coupled to the body 22 of the motor vehicle and at least one drive 2 according to the proposal for the motorized displacement of the closure element 3. Reference may be made to all the explanations in relation to the drive 2 according to the proposal.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 1 drivetrain
2 drive
3 rear hatch
4 drive motor
5 rear hatch opening
6 friction engagement mechanism
7 coupling mechanism
8 central friction engagement element
9 radially inner friction engagement element
10 radially external friction engagement element
11 motor-side drive component
12 drive component
13 tolerance ring
14 protrusions
15 flat portions
16 indentations
18 spindle/spindle nut gear mechanism
19 spindle
20 spindle nut
21 intermediate gear mechanism
2a ball sockets
2b ball sockets
7a motor-side coupling piece
7b coupling piece
7c housing
8a internal friction face
8b external friction face
9a friction face
9b first portion
9c second portion
10a friction face
10b portions
10b first portion
10c second portion
11a coupling-counter piece
12a separate coupling-counter piece
13a lateral edges
13b lateral edges
17a motor-side plug type connection
17b plug type connection
X drive Axle While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drivetrain of a drive for motorized displacement of a closure element of a motor vehicle, wherein the drive comprises a drive motor, the drivetrain comprising:
 a coupling mechanism configured to couple two drive components of the drivetrain in a rotationally secure manner,
 a friction engagement mechanism configured to provide a friction torque between a motor-side component of the drive components and a motor-averted component of the drive components,
 wherein the friction engagement mechanism is a component of a coupling mechanism of the drivetrain,
 wherein the coupling mechanism is coupled in a rotationally secure manner to the motor-side component of the drive components via a motor-side coupling piece of the coupling mechanism and to the motor-averted component of the drive components via a motor-averted coupling piece of the coupling mechanism,
 wherein the motor-side component of the drive components of the drivetrain is a drive shaft formed by a gear shaft of an intermediate gear mechanism,
 wherein the motor-averted component of the drive components of the drivetrain is a gear mechanism component of a gear mechanism provided with a spindle and spindle nut,
 wherein the coupling mechanism includes a plurality of friction engagement elements, including at least a central element and two additional elements, configured to be rotated about a drive axle and are arranged coaxially relative to each other in the drivetrain and which form the friction engagement mechanism, wherein the central element of the friction engagement elements is in frictional engagement with the two additional elements of the plurality of friction engagement elements,
 wherein the plurality of friction engagement elements are arranged concentrically relative to each other at least in portions,
 wherein the central friction engagement element is a tolerance ring clamped radially between the two additional elements of the friction engagement elements in order to provide a friction engagement connection, and
 wherein the motor-averted coupling piece of the coupling mechanism includes a plurality of radial or axial protrusions received within associated recesses formed in the motor-averted component of the drive components to form an axial, rotationally interlocked plug connection between the motor-averted coupling piece of the coupling mechanism and the motor-averted component of the drive components.

2. The drivetrain of claim 1, wherein the central friction engagement element includes a plurality of radial protrusions extending in a peripheral direction.

3. The drivetrain of claim 1, wherein the radial protrusions of the central friction engagement element extend radially inwardly and/or radially outwardly.

4. The drivetrain of claim 1, wherein the coupling mechanism is configured as an overload coupling connected between the two drive components of the drivetrain.

5. The drivetrain of claim 1, wherein a breakaway torque between the central friction engagement element and an inner friction engagement element of the two additional elements of the plurality of friction engagement elements, arranged radially inside the central friction engagement element, is greater than a breakaway torque between the central friction engagement element and an outer friction engagement element of the two additional elements of the plurality of friction engagement elements, arranged radially outside the central friction engagement element.

6. The drivetrain of claim 1, wherein a radially internal friction face of the central friction engagement element and/or a radially external friction face of the central friction engagement element and/or a friction face formed by an inner friction engagement element arranged radially inside the central friction engagement element and/or a friction face formed by an outer friction engagement element arranged radially outside the central friction engagement element is/are metal.

7. The drivetrain of claim 1, wherein the central friction engagement element is partially or completely formed of metal.

8. The drivetrain of claim 1, wherein a ratio between a maximum outer radius of the central friction engagement element and an axial length of the central friction engagement element is at least 1.

9. The drivetrain of claim 1, wherein an inner friction engagement element of the two additional elements arranged radially inside the central friction engagement element and/or an outer friction engagement element of the two additional elements arranged radially outside the central friction engagement element is/are in multiple pieces.

10. The drivetrain of claim 9, wherein a first portion of the inner friction engagement element and/or of the outer friction engagement element is formed of a metal material.

11. The drivetrain of claim 1, wherein an inner friction engagement element of the two additional elements arranged radially inside the central friction engagement element and an outer friction engagement element of the two additional elements arranged radially outside the central friction engagement element coupled to each other in an axially positive-locking manner and/or are locked to each other.

12. The drivetrain of claim 1, wherein an inner friction engagement element of the two additional elements arranged radially inside the central friction engagement element forms the motor-side coupling piece of the coupling mechanism and an outer friction engagement element of the two additional elements arranged radially outside the central friction engagement element forms the motor-averted coupling piece of the coupling mechanism, or
wherein the inner friction engagement element forms the motor-averted coupling piece of the coupling mechanism and the outer friction engagement element, arranged radially outside the central friction engagement element, forms the motor-side coupling piece of the coupling mechanism.

13. The drivetrain of claim 1, wherein the motor-side coupling piece of the coupling mechanism includes a plurality of radial or axial protrusions received within associated recesses formed in the motor-side component of the drive components to form an axial, rotationally interlocked plug connection between the motor side coupling piece of the coupling mechanism and the motor-side component of the drive components.

14. A drive for motorized displacement of a closure element of a motor vehicle, the drive comprising:
the drivetrain of claim 1.

15. A closure element arrangement of a motor vehicle provided with a vehicle body and a closure element coupled to the vehicle body, the closure arrangement comprising:
the drivetrain of claim 13.

16. The drivetrain of claim 2, wherein the protrusions are stamped portions.

17. The drivetrain of claim 3, wherein the radially inward extending protrusions form a radially internal friction face configured to engage a friction face formed by an inner friction engagement element arranged radially inside the central friction engagement element.

18. The drivetrain of claim 1, wherein a breakaway torque between the central friction engagement element and the outer friction engagement element is greater than a breakaway torque between the central friction engagement element and the inner friction engagement element arranged radially inside the central friction engagement element.

19. The drivetrain of claim 7, wherein the central friction engagement element is a metal ring extending continuously in a peripheral direction.

20. The drivetrain of claim 7, wherein the central friction engagement element is a metal ring defining a number of slots extending in a peripheral direction.

21. A drivetrain of a drive for motorized displacement of a closure element of a motor vehicle, wherein the drive comprises a drive motor, the drivetrain comprising:
a coupling mechanism configured to couple two drive components of the drivetrain in a rotationally secure manner,
a friction engagement mechanism configured to provide a friction torque between a motor-side component of the drive components and a motor-averted component of the drive components,
wherein the friction engagement mechanism is a component of the coupling mechanism of the drivetrain,
wherein the coupling mechanism is coupled in a rotationally secure manner to the motor-side component of the drive components via a motor-side coupling piece of the coupling mechanism and to the motor-averted component of the drive components via a motor-averted coupling piece of the coupling mechanism,
wherein the motor-side component of the drive components of the drivetrain is a drive shaft formed by a gear shaft of an intermediate gear mechanism,
wherein the motor-averted component of the drive components of the drivetrain is a gear mechanism component of a gear mechanism provided with a spindle and spindle nut,
wherein the coupling mechanism includes a plurality of friction engagement elements, including at least a central element and two additional elements, configured to be rotated about a drive axle and are arranged coaxially relative to each other in the drivetrain and which form the friction engagement mechanism, wherein the central element of the friction engagement elements is in frictional engagement with the two additional elements of the plurality of friction engagement elements,
wherein the friction engagement elements are arranged concentrically relative to each other at least in portions, and
wherein the central friction engagement element is a tolerance ring clamped radially between the two additional elements of the friction engagement elements in order to provide a friction engagement connection,
wherein one of the motor-averted coupling piece of the coupling mechanism and the motor-averted component of the drive components includes axially protruding flanges received within associated notches formed in the other one of the motor-averted coupling piece of the coupling mechanism and the motor-averted component of the drive components, to form a claw type coupling between the motor-averted coupling piece of the coupling mechanism and the motor-averted component of the drive components.

22. The drivetrain of claim 21, wherein one of the motor-side coupling piece of the coupling mechanism and the motor-side component of the drive components includes axially protruding flanges received within associated notches formed in the other one of the motor-side coupling piece of the coupling mechanism and the motor-side component of the drive components, to form a claw type coupling between the motor-side coupling piece of the coupling mechanism and the motor-side component of the drive components.

23. A drivetrain of a drive for motorized displacement of a closure element of a motor vehicle, wherein the drive comprises a drive motor, the drivetrain comprising:
 a coupling mechanism configured to couple two drive components of the drivetrain in a rotationally secure manner,
 a friction engagement mechanism configured to provide a friction torque between a motor-side component of the drive components and a motor-averted component of the drive components,
 wherein the friction engagement mechanism is a component of the coupling mechanism of the drivetrain,
 wherein the coupling mechanism is coupled in a rotationally secure manner to the motor-side component of the drive components via a motor-side coupling piece of the coupling mechanism and to the motor-averted component of the drive components via a motor-averted coupling piece of the coupling mechanism,
 wherein the motor-side component of the drive components of the drivetrain is a drive shaft formed by a gear shaft of an intermediate gear mechanism,
 wherein the motor-averted component of the drive components of the drivetrain is a gear mechanism component of a gear mechanism provided with a spindle and spindle nut,
 wherein the coupling mechanism includes a plurality of friction engagement elements, including at least a central element and two additional elements, configured to be rotated about a drive axle and are arranged coaxially relative to each other in the drivetrain and which form the friction engagement mechanism, wherein the central element of the friction engagement elements is in frictional engagement with the two additional elements of the plurality of friction engagement elements,
 wherein the friction engagement elements are arranged concentrically relative to each other at least in portions, and
 wherein the central friction engagement element is a tolerance ring clamped radially between the two additional elements of the friction engagement elements in order to provide a friction engagement connection,
 wherein one of the motor-averted coupling piece of the coupling mechanism and the motor-averted component of the drive components includes radially inner teeth engaging with associated radially outer teeth formed in the other one of the motor-averted coupling piece of the coupling mechanism and the motor-averted component of the drive components, to form a multiple-toothed connection between the motor-averted coupling piece of the coupling mechanism and the motor-averted component of the drive components.

24. The drivetrain of claim 23, wherein one of the motor-side coupling piece of the coupling mechanism and the motor-side component of the drive components includes radially inner teeth engaging with associated radially outer teeth formed in the other one of the motor-side coupling piece of the coupling mechanism and the motor-side component of the drive components, to form a multiple-toothed connection between the motor-side coupling piece of the coupling mechanism and the motor-side component of the drive components.

* * * * *